United States Patent
Takeo et al.

(10) Patent No.: US 6,675,210 B1
(45) Date of Patent: *Jan. 6, 2004

(54) METHOD, APPARATUS AND RECORDING MEDIUM FOR DATA TRANSFER

(75) Inventors: Hideya Takeo, Kanagawa-ken (JP); Eiji Ogawa, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/375,559

(22) Filed: Aug. 17, 1999

(30) Foreign Application Priority Data

Aug. 17, 1998 (JP) .......................................... 10/230671
Mar. 3, 1999 (JP) .......................................... 11/055621

(51) Int. Cl.$^7$ ............................................... G06F 13/00
(52) U.S. Cl. ........................ 709/224; 709/203; 709/217; 709/219
(58) Field of Search ................................ 709/200, 201, 709/203, 217, 218, 219, 223, 224, 225, 226, 227

(56) References Cited

U.S. PATENT DOCUMENTS

| | | | | |
|---|---|---|---|---|
| 5,687,332 A | * | 11/1997 | Kurahashi et al. .......... | 395/335 |
| 5,764,235 A | * | 6/1998 | Hunt et al. .................. | 345/428 |
| 5,845,255 A | * | 12/1998 | Mayaud ......................... | 705/3 |
| 5,965,859 A | * | 10/1999 | DiVincenzo et al. ........ | 235/380 |
| 6,014,694 A | * | 1/2000 | Aharoni et al. ............. | 709/219 |
| 6,148,333 A | * | 11/2000 | Guedalia et al. ............ | 709/219 |
| 6,172,672 B1 | * | 1/2001 | Ramasubramanian et al. .......................... | 345/327 |
| 6,260,021 B1 | * | 7/2001 | Wong et al. .................... | 705/2 |
| 6,282,330 B1 | * | 8/2001 | Yokota et al. ............... | 382/309 |
| 6,330,068 B1 | * | 12/2001 | Matsuyama ................ | 358/1.14 |
| 6,332,146 B1 | * | 12/2001 | Jebens et al. ................ | 707/104 |
| 6,400,411 B1 | * | 6/2002 | Bayes et al. ................. | 348/572 |
| 6,430,354 B1 | * | 8/2002 | Watanabe ..................... | 386/46 |
| 6,501,472 B1 | * | 12/2002 | Hunt et al. ................... | 345/428 |

* cited by examiner

*Primary Examiner*—Moustafa M. Meky
(74) *Attorney, Agent, or Firm*—Sughrue Mion, PLLC (57) ABSTRACT

When image data comprising data at a plurality of levels, each having a different resolution, density resolution, and reproduced image quality, are transferred to a terminal, image data at a level appropriate for the terminal are easily transferred. At the time transfer of image data is requested by a terminal, if the name of the user of the terminal is input, transfer request information and name information is transferred to an image server via a network. In the image server, data at a level appropriate for the user are specified based on the name information and the data are transferred to the terminal which has requested the transfer. For example, when an image reading terminal requests image transfer, highest level data are transferred, while data at a level lower than the highest are transferred when a reference terminal requests the transfer.

15 Claims, 6 Drawing Sheets

METHOD, APPARATUS AND RECORDING MEDIUM FOR DATA TRANSFER

BACKGROUND OF THE INVENTION

1. Filed of the Invention

The present invention relates to a method and an apparatus for transferring image data from a terminal to an image server, and to a computer-readable recording medium storing a program to cause a computer to execute the method.

2. Description of the Related Art

When image data stored in an image server are transferred based on transfer request by a client, the client receives and decompresses the data to reproduce an image if the image data have been compressed based on a predetermined coding algorithm.

Meanwhile, as a format for storing image data, various formats such as JPEG, GIF, and TIFF are used. Recently, another format has been proposed. According to this format, image data are stored by being decomposed into a hierarchy based on resolutions or density resolutions (bit resolutions) and data at each level of the hierarchy (hierarchical data) are stored after coding and compression thereof. More specifically, image data are decomposed into the hierarchical data according to multiple resolutions or density resolutions through wavelet transform or the like, and the hierarchical data at each resolution or density resolution are coded according to the hierarchy and saved in a file after compression thereof.

This storing method has the following characteristics:

(1) Unlike a DCT (Discrete Cosine Transform) method used in the conventional JPEG format, no artifacts such as block distortion are created, since image data are not processed for each block.

(2) Only resolution information which is necessary for transfer of image data needs to be transferred, since the image data are coded hierarchically. This enables efficient image transfer.

(3) Various kinds of image processing such as frequency enhancing processing can be carried out comparatively easily, since image data are decomposed into the data at multiple resolutions or density resolutions.

(4) Simultaneous decomposition of space and frequency according to multiple-resolution analysis is possible. In a low frequency range wherein coding efficiency is greatly affected, an orthogonal transform can be carried out in a wide range, whereas in a high frequency range, an orthogonal transform is possible in a narrow range. Therefore, even when quantization noise is generated near an edge of an image, spatial spread of the noise can be suppressed. As a result, the noise is not easy to perceive.

Like a FlashPix file proposed by Eastman Kodak Co., a file format enabling storage of data sets having different natures in a file has also been proposed. Hierarchical data decomposed into multiple resolutions or density resolutions can be stored in such a file according to the FlashPix standard.

By decomposing the image data into multiple resolutions or density resolutions, the image data can be reconstructed from data at a plurality of levels having different resolutions or density resolutions.

Furthermore, it is possible to construct image data representing an image from data at a plurality of levels representing the same image each having different quality when the image is reproduced. In other words, image data obtained by decompressing image data having been compressed in a reversible manner have no degradation, while image data obtained by decompressing image data having been compressed in an irreversible manner have degradation depending on a sampling interval of the data. Therefore, quality of a reproduced image can be changed according to whether image data are compressed in a reversible manner or in an irreversible manner. Consequently, image data can be reconstructed from the data at a plurality of levels having different reproduced image quality.

When image data are constructed from data at a plurality of levels and stored in an image server in this manner, data at an appropriate resolution or density resolution or having appropriate quality of a reproduced image can be transferred to a client based on the client's request, and the client's request can be met.

Furthermore, a method of transferring image data to a terminal connected to an image server having means for storing an image data set in detail, that is, data at a high level (high resolution or density resolution, or high reproduced image quality) and for converting a level of the image to be output, instead of an image server storing image data at a plurality of levels, has been known. In this case, as has been described above, data at an appropriate level can be transferred to the client based on the request by the client.

However, the level of the data requested by a client is different depending on a user of the terminal, the type of the terminal, and the usage of the image data. For example, the level of an image requested is different between the cases of a diagnostic purpose such as a diagnosis in detail, a confirmation purpose such as confirmation of an outline, and taking a view of an outline image such as subtraction at an interval. Furthermore, the level requested is different between wards or doctors, and each has a predetermined level in most cases.

For this reason, it is necessary to specify the level of data desired by a client by inputting the level whenever image data transfer is requested. As a result, an operation for requesting data transfer is very troublesome.

SUMMARY OF THE INVENTION

The present invention has been created based on consideration of the above problems. An object of the present invention is to provide a method and an apparatus for easily transferring image data at a desired level to a terminal without causing a problem on a client, and a computer-readable recording medium storing a program to cause a computer to execute the method.

A data transfer method of the present invention is a method of transferring image data to a terminal connected to an image server from the server storing image data including a plurality of levels or comprising means for storing image data and for converting a level of an image to be output, and the method comprises the steps of:

obtaining information regarding the terminal; and transferring to the terminal the image data at a level appropriate for the terminal, based on the information regarding the terminal.

The "level of an image" herein referred to may be different depending on a request by the terminal, and the level means resolution and/or density resolution, specifically.

The "image data including a plurality of levels" means to construct image data from a plurality of data sets each having different resolution and/or density resolution obtained by decomposing image data into multiple resolutions and/or density resolutions. Alternatively, the image data comprises sets of image data each having different reproduced image quality resolution and/or density resolution, as in the case where the image data comprise data sets each having different reproduced image quality such as reversibly compressed data and irreversibly compressed data. These levels may be used solely or in a combination.

The "information regarding the terminal" means information obtained from the terminal, that is, information corresponding to the level of the image requested by the terminal More specifically, the information regarding the terminal means information regarding a terminal user input from the terminal, information specific to the terminal, and information input from the terminal regarding usage of the image data, for example.

The "information regarding a terminal user" means any information by which the terminal user can be identified. More specifically, the information means the name and ID information input by the user, ID information obtained by reading an ID card, audio information of the terminal user, a fingerprint or a handprint of the user, information obtained by recognizing the face of the user, and information regarding the section the user belongs to, for example. These kinds of information can be used solely or in combination.

The "information specific to the terminal" means information by which the terminal can be identified or information indicating a level of an image which can be displayed on the terminal. For example, the IP address specific to the terminal, the type number of the terminal, and a data representation ability of the terminal can be listed as the information specific to the terminal.

The "information regarding the usage of the image data" means not only information regarding complexity of the image and information regarding a transfer rate, but also information regarding a diagnosis menu and a photographing menu, and information regarding the dosage of radiation used upon photographing a radiation image, in the case of the images used in the field of medicine.

When the complexity of an image is increased, the image can be observed in detail if the image is reproduced by using data at a higher level. Therefore, in the case where the terminal user inputs, by using the terminal, an instruction to transfer data according to the complexity, "the information regarding complexity of an image" means information to cause an image server to transfer image data at a level corresponding the complexity of the image.

The "information regarding a transfer rate" means information to instruct an image server to transfer the image data at a level whose transmission can be completed within a predetermined amount of time depending on a band width of a transfer path, in the case where the user inputs an instruction to transfer the data based on the transfer rate.

Furthermore, when progress observation is carried out, high level data are necessary, since information in detail regarding a patient's latest image data are needed. However, demands for high level image data of the past are not high. Therefore, "information regarding a diagnosis menu" means information to instruct transfer of high level image data for a latest image and to instruct transfer of moderate level image data for an image in the past, in the case where a progress observation purpose has been input.

Moreover, high level image data are necessary in the case where a minute tumor is diagnosed from a chest radiation image, while a demand for such high level image data as those for a chest radiation image is not so high in the case where a radiation image of a broken bone of a leg or an arm is needed. Therefore, the "information regarding a photographing menu" means information to instruct transfer of high level image data for a radiation image obtained by photographing a chest and transfer of a moderate level image data for a radiation image of a broken bone of a leg or an arm, in the case where a terminal user inputs from the terminal an instruction to transfer data based on a photographed portion.

For an important image, photographing is carried out with high dosage of radiation in order to reduce noise. Therefore, "information regarding dosage" means information to instruct an image server to transfer high level image data such that the data enable observation of an image in detail when the dosage is higher, in the case where a terminal user inputs an instruction to transfer data based on the dosage.

A data transfer apparatus of the present invention is an apparatus for transferring image data to a terminal connected to an image server from the server storing image data at a plurality of levels or comprising means for storing image data and for converting a level of an image to be output, and the apparatus comprises:

terminal information obtaining means for obtaining information regarding the terminal; and transfer means for transferring to the terminal the image data at a level appropriate for the terminal, based on the information regarding the terminal.

The data transfer method of the present invention may be provided as a computer-readable recording medium storing a program to cause a computer to execute the method.

According to the present invention, since image data at a level appropriate for the terminal are transferred based on the terminal information, when a terminal user inputs from the terminal an instruction to request image data transfer, image data at a desired level in accordance with the terminal user, the terminal, the usage of the image and the like can be transferred without specifying the level. Therefore, image data at a desired level can be transferred easily without a troublesome operation for specifying the level.

DESCRIPTION OF THE PREFERRED EMBODIMENTS

Hereinafter, embodiments of the present invention will be explained with reference to the accompanying drawings.

Figure 1:
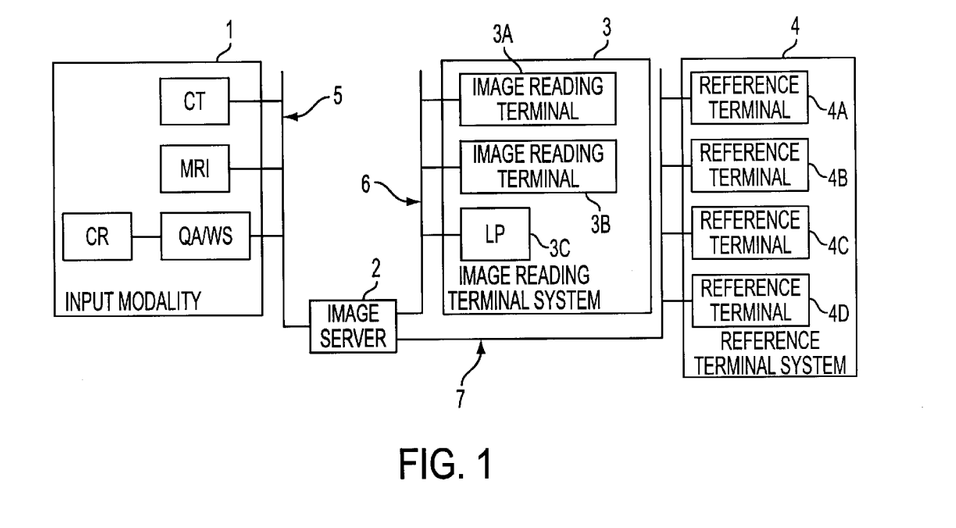
FIG. 1 is a block diagram showing an outline configuration of a data transfer system according to a first embodiment of the present invention.

FIG. 1 is a block diagram showing an outline configuration of a data transfer system according to a first embodiment of the present invention. As shown in FIG. 1, the data transfer system according to the first embodiment is a medical network system used in the field of medicine and comprises an input modality 1 such as an apparatus for CR, CT, MRI, QA/WS and the like for recording image data S0, an image server 2 connected to the input modality 1 via a network 5 and for storing the image data S0 recorded by the input modality 1 by constructing the image data from data at a plurality of levels, an image reading terminal system 3 connected to the image server 2 via a network 6, and a reference terminal system 4 connected to the image server 2 via a network 7.

The image reading terminal system 3 in this embodiment comprises 2 image reading terminals 3A and 3B each having a high definition CRT, and a laser printer 3C. The reference terminal system 4 in this embodiment comprises 4 reference terminals 4A~4D each having a comparatively low definition CRT such as a CRT for a personal computer.

Figure 2A:
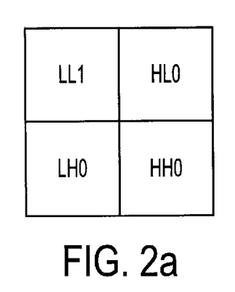
FIGS. 2a, 2b and 2c are diagrams showing a state where image data are wavelet-transformed and coded at each hierarchical level.
Figure 2B:
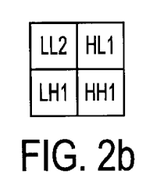
Figure 2C:
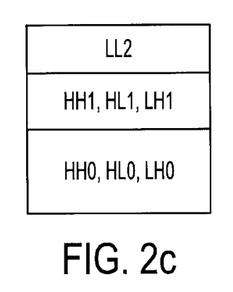

The image data S0 are decomposed into hierarchical data at each hierarchical level at each resolution in a manner described below and stored there after. As shown in FIG. 2(a), the original image data are converted from the RGB color space into the YCC color space. The image data in the YCC color space are then wavelet-transformed as shown in FIG. 2(b), and decomposed into 4 sets of data, namely LL1, HL0, LH0 and HH0 at multiple resolutions. The data LL1 represents an image whose width and height have been reduced to ½ of those of the original image, and the data HL0, LH0 and HH0 respectively represent images of a vertical edge component, a horizontal edge component, and a diagonal edge component. As shown in FIG. 2(c), 4 sets of data LL2, HL1, LH1 and HH1 are obtained through wavelet transform on the data LL1. The data LL2 represents an image whose width and height have been reduced to ½ of those of the data LL1, and the data HL1, LH1 and HH1 represent images of a vertical edge component, a horizontal edge component and a diagonal edge component of the data LL1. The wavelet transform is repeated a desired number of times on data LL obtained at each wavelet transform, and data at multiple resolutions are obtained thereby. Thereafter, the data at each resolution are coded, and the hierarchical data are stored as the image data S0 in a file in the image server 2 after compression thereof.

In this embodiment, the image data S0 are constructed not only by data sets decomposed into multiple resolutions but also at multiple density resolutions. Furthermore, as for the method of compression, reversibly compressed data enabling high quality image reproduction as well as irreversibly compressed data such that an image reproduced therefrom has comparatively low quality are included. In this embodiment, high level data means high resolution and high density resolution data and/or reversibly compressed data enabling reproduction of a high quality image, and low level data means low resolution and low density resolution data and/or irreversibly compressed data such that an image reproduced therefrom has degraded quality.

In the medical network system shown in FIG. 1, users of the image data S0 on the network are roughly classified into 2 groups. One is users who read images for the first time and generate diagnostic reports by carrying out diagnoses based on the images and clinical chart information belonging to the images. These kind of diagnoses are called primary diagnoses and are carried out by radiologists. Such primary diagnoses are carried out by using the image reading terminal system 3 comprising the CRT's and the laser printer 3C capable of reproducing high level images.

The other group is clinicians who give their views on their patients by observing the images used for the primary diagnoses by the radiologists. In this case, the images are mere references and their views are determined based on the diagnostic reports. Therefore, moderate level images are sufficient. For viewing such images, the reference terminal system 4 which does not have high level CRT's is used.

Figure 3:
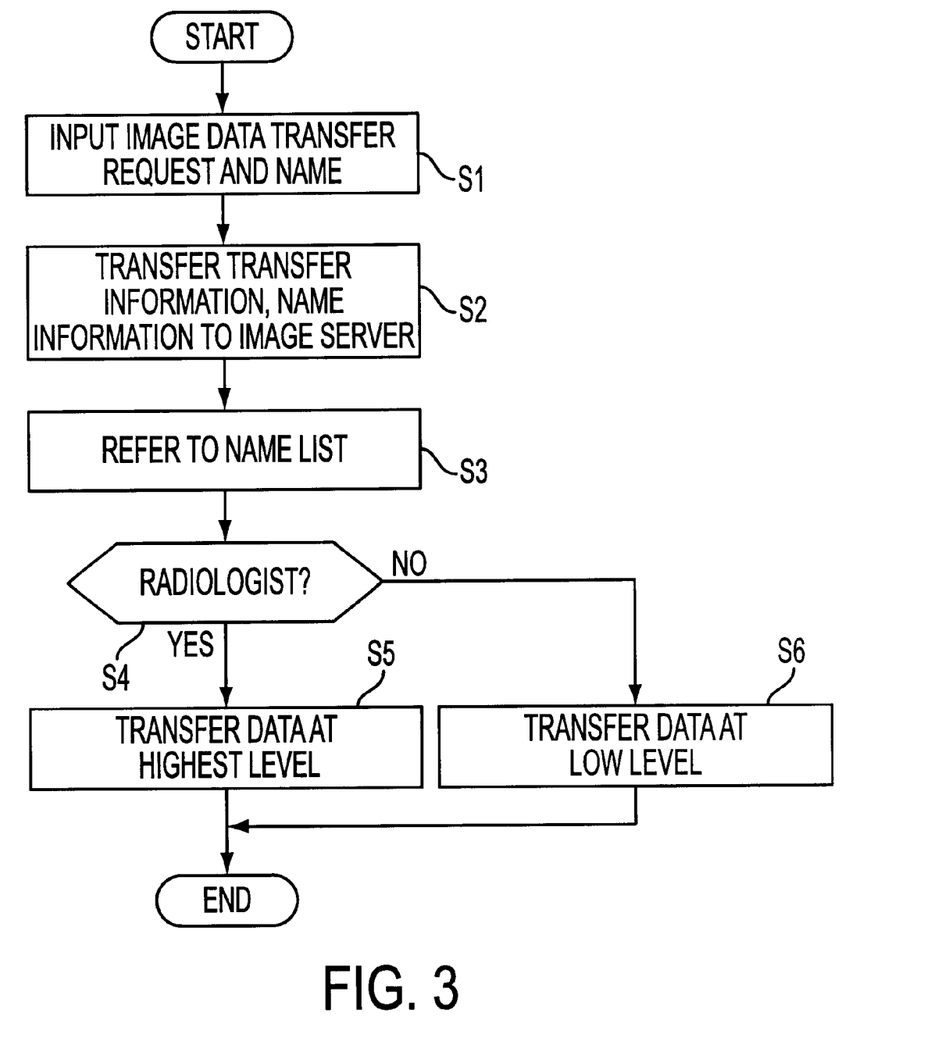
FIG. 3 is a flow chart showing processing carried out by the data transfer system of the first embodiment.

An operation of the first embodiment will be explained next. FIG. 3 is a flow chart showing processing carried out by the data transfer system according to the first embodiment. At step S1, an instruction to request transfer of the image data S0 and the name of the terminal user are input from the image reading terminal system 3 or the reference terminal system 4. The terminal system 3 or 4 transfers transfer information of the image data SC and information regarding the name of the user of the terminal system 3 or 4 to the image server 2 via the network 6 or 7 respectively (step S2). Having received the information, the image server 2 refers to a name list registered in a database of the image server, based on the information regarding the user name (step S3), and judges whether or not the user is a radiologist to use the image reading terminal system 3 (step S4). If the user is a radiologist, the image server specifies data at a highest level, that is, reversibly compressed data at a highest resolution and having a highest bit resolution, and transfers the data at the highest level to one of the terminals 3A or 3B which is desired by the user (step S5) to finish the processing.

Meanwhile, when the name of the user shows that the user is not a radiologist to use the image reading terminal system 3, the image server 2 specifies data at a level lower than the highest, that is, irreversibly compressed data at a low resolution and having a low bit resolution, and transfers the data to any one of the desired reference terminals 4A~4D (step S6), to finish the processing.

As has been described above, according to the present invention, since the data corresponding to the name of the terminal user input from the terminal system 3 or 4 are transferred, the terminal user does not need to input the level of the data to be transferred, and the data at the desired level can be transferred. Therefore, data at a desired level can be transferred easily without a troublesome operation of specifying the level.

In the first embodiment above, the name of a user of the terminal is input from the terminal system 3 or 4, and the terminal user is identified based on the name, to specify the level of the data to be transferred. However, a reading unit for reading an ID card of a terminal user may be included in the terminal systems 3 and 4, and the user can be identified by reading ID information of the user stored in the ID card by using the reading unit. Alternatively, an ID number may be input instead of the name of the terminal user. Furthermore, the terminal user may be identified by his/her voice, fingerprint, handprint, and the like. In this case, recognition apparatuses for recognizing voices, fingerprints, handprints and the like are included in the terminal systems 3 and 4. The terminal systems 3 and 4 may have a respective digital camera for photographing the face of a user, and the user may be identified by analyzing the photographed face. In this case, a characteristic value of the face is extracted from the photographed face image and pattern recognition is carried out to identify the user. Alternatively, a drawing of his/her outline, eyes, mouse, nose and the like are extracted from the photographed face image and the user is identified by pattern matching between the drawings and a pre-registered pattern. The user may be identified by inputting his/her position (such as a radiologist, a clinician, an intern, a technician, and the like).

In the first embodiment above, the information to identify the terminal user is input from the terminal system 3 or 4. However, information specific to the terminal system 3 or 4 may be transferred to the image server 2 upon requesting image data transfer. In this case, the address or the apparatus number of the terminal to specify whether the terminal is in the image reading terminal system 3 or in the reference terminal system 4 may be used as the information specific to the terminal, for example. When the apparatus number is used, the section the terminal belongs to and the user of the terminal are identified based on the apparatus number transferred to the image server and data at a level appropriate for the apparatus number are transferred.

In the first embodiment above, in the case where the user of the terminal is a physician in charge of the patient of the requested image data S0, it is preferable for the image data at the highest level to be transferred, regardless of which terminal system has been used, since a detailed diagnosis regarding the patient's condition is often necessary.

In the first embodiment above, the level of the image data S0 may be specified in accordance with the representation ability of an apparatus to reproduce the image data S0. For example, in the case where transfer of the image data S0 is requested by the reference terminal system 4, the data at a resolution lower than the highest are transferred when an instruction to reproduce the image on the CRT is received. On the other hand, when an instruction to reproduce the image as a printed image by using the printer is received, the data at the highest level are transferred so that a high quality image can be reproduced. The information regarding the representation ability of the reproducing apparatuses may be obtained automatically by the image server 2.

In the first embodiment above, the image data may be transferred after the level of the image data S0 is specified depending on the purpose of diagnosis. For example, when a progress observation or comparison observation is carried out, the latest image is the most important, and for images in the past to be compared with, data at a high level are not necessary. Therefore, when the transfer is requested by the image reading terminal system 3 and information indicating progress observation or comparison observation is input, the latest image data S0 at the highest resolution are transferred while the image data at a level lower than the highest are transferred as the image data S0 in the past to be compared with.

In the first embodiment above, the level of the image data S0 may be specified depending on complexity of the image represented by the image data S0 whose transfer has been requested. For example, in the case where an instruction to transfer the image data S0 in accordance with the complexity is input, the complexity of the image represented by the requested image data S0 may be calculated by using a fractal dimension analysis for example, and the image data S0 at a higher resolution in accordance with increasing complexity are transferred so that the reproduced image can be observed in detail.

In the first embodiment above, the level of the image data S0 to be transferred may be specified depending on a photographed portion of the requested image data S0. In this case, information regarding the photographed portion is recorded in a header of the image data S0 upon recording the image data S0. In the case where an instruction to transfer the image data in accordance with the photographed portion is input upon requesting transfer of the image data S0, the information regarding the photographed portion is read from the header of the requested image data S0, and the image data S0 are transferred after the level of the image data S0 is specified based on the information regarding the photographed portion. For example, when the photographed portion is a chest, data at the highest level are transferred in order to diagnose a minor tumor, while data at a level lower than the highest are transferred in the case of a broken bone of an arm or leg, since high level data such as those for the chest are not necessary.

In the first embodiment above, the level of the image data S0 to be transferred may be specified depending on radiation dosage at the time of recording the requested image data S0. In this case, information regarding the dosage at the time of recording the image data S0 is recorded in the header of the image data S0. When an instruction to transfer the image data S0 depending on the dosage is input upon requesting the image data transfer, the information regarding the dosage is read from the header of the requested image data S0 and the image data S0 are transferred after the level of the image data S0 to be transferred is judged based on the dosage information. For example, the larger the dosage of the image data S0 is, the higher the level of the image data S0 to be transferred becomes, since an important image is photographed with large dosage to reduce noise.

In the first embodiment above, in the case.where transfer of the image data S0 is requested by the reference terminal system 4, the level of the image data S0 to be transferred may be specified depending on the transfer rate of the network 7. The level of the image data S0 is determined in accordance with the transfer rate so that time necessary for transfer completion is approximately constant regardless of the transfer rate of the network. For example, when the level depends on a bandwidth of the network 7 and the band width is 10 Mbps, the transfer rate becomes 1/10 of that of the case of 100 Mbps. Therefore, when an instruction to transfer image data S0 in accordance with the transfer rate is input upon transfer request of the image data S0, the level of the image data S0 is specified so that the transfer is completed within a predetermined amount of time regardless of the transfer rate. In this case, the image data S0 may be transferred after the compression ratio of the image data S0 is changed. For example, when the band width is 10 Mbps, the image data S0 are transferred after compressing the image data S0 so that the amount of the data becomes 1/10 of that of the 100 Mbps case. Alternatively, the image data S0 may be transferred by monitoring the transfer rate of the network 7 and by judging an appropriate level of the image data S0 or a compression ratio thereof. In this manner, the image data S0 can be transferred to the terminal systems 3 and 4 in an almost predetermined amount of time, without depending on the transfer rate of the network 7.

In the above embodiment, when the image data S0 are referred to for the first time, a condition regarding the level at another time of transfer may be added to the image data S0 so that the image data S0 can be transferred based on the added condition regarding the level, regardless of whether the terminal system is the image reading terminal system 3 or the reference terminal system 4.

Figure 4:
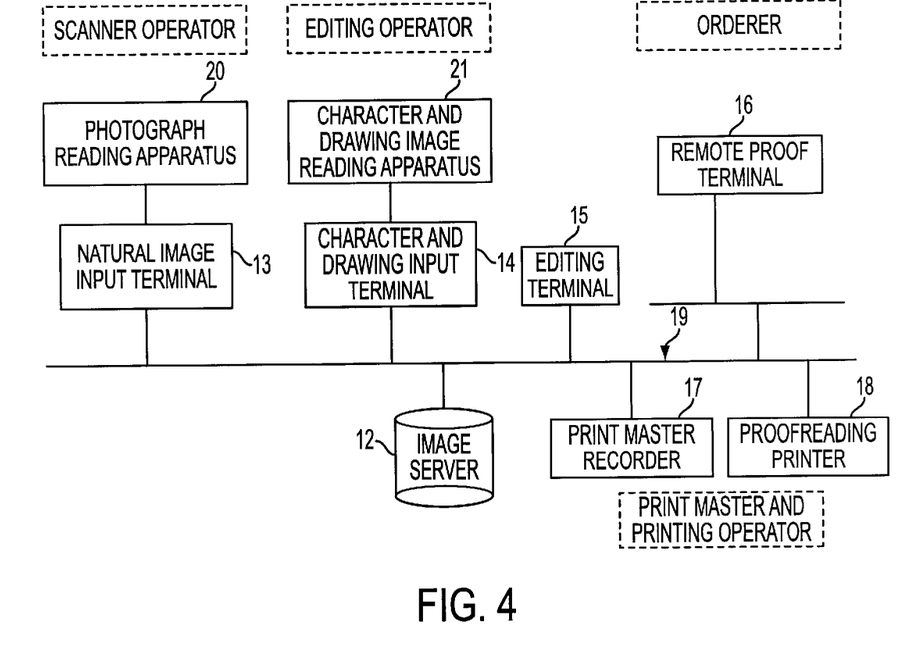
FIG. 4 is a block diagram showing an outline configuration of a data transfer system according to a second embodiment of the present invention.

A second embodiment of the present invention will be explained next. FIG. 4 is a block diagram showing an outline configuration of a data transfer system according to the second embodiment. As shown in FIG. 4, the data transfer system according to the second embodiment is a DTP (Desk Top Publishing) network system used in the field of printing. The data transfer system comprises an image server 12 storing image data S0 comprising a plurality of levels as in the first embodiment, a natural image input terminal 13 used by a scanner operator, a character and drawing input terminal 14 and editing terminal both used by an editing operator, a remote proof terminal 16 used by an orderer, a print master recorder 17 used by a print master and printing operator, and an editing printer 18, all of which are connected via a network 19.

As in the first embodiment, the image server 12 stores image data at a plurality of levels such as image data read by an image reading apparatus like a scanner or a digital camera and processed by an image processing apparatus, character and figure data generated by a word processor and a block copy reading apparatus, and edited image data generated by laying the above data out (all of which are called the image data S0 as a whole).

A photograph reading apparatus 20 is connected to the natural image input terminal 13, while a character and drawing reading apparatus 21 is connected to the character and drawing image input terminal 14.

In such a DTP network system, users who access the image data S0 on the network can be classified, by their roles, into orderers, scanner operators, editing operators, and print master and printing operators.

An orderer is a person who actually orders printing, and means a person in charge of each section of a department store in the case of an department store advertisement, and a person in charge of an advertisement section of a manufacturer in the case of a catalogue. The orderer needs to carry out finish confirmation (what is known as proofreading) of the printing, and checks the state of finish by accessing the image data S0 at an intermediate stage in the image server of the printing company, using the remote proof terminal 16 in the network environment. The orderer does not carry out operation of manipulating the image data S0, and uses a dedicated line between the companies or a public telephone line. Therefore, image data S0 at a highest level are not necessarily needed in terms of communication efficiency, and an image is reproduced by a color printer at 300 dpi or by a CRT at equal to or less than 1000 dpi.

A scanner operator is in charge of processing the natural image data and needs to directly manipulate the image data S0 as photograph image data at the highest level in full colors.

An editing operator directly manipulates the image data S0 of various kinds and generates edited data. The editing operator needs the image data S0 at a high level, since he/she mainly carries out layout processing and composition processing on character, figure, and natural images. However, in many cases, no color processing of the natural image is carried out, and in that case, it is preferable for the editing operator to be able to select a setting for not using a full-color image in order to improve operation efficiency.

A print master and printing operator outputs a print for proofreading as a printing sample, using the dedicated proofreading printer 18, and outputs the image data S0 having been laid out completely from the print master recorder 17. In the case where the proofreading printer 18 is used, output is carried out at a high resolution ranging from 400~3000 dpi and in full colors, while partitioned printing is carried out at a resolution of 1200~4000 dpi in the case where the print master recorder 17 is used.

Figure 5:
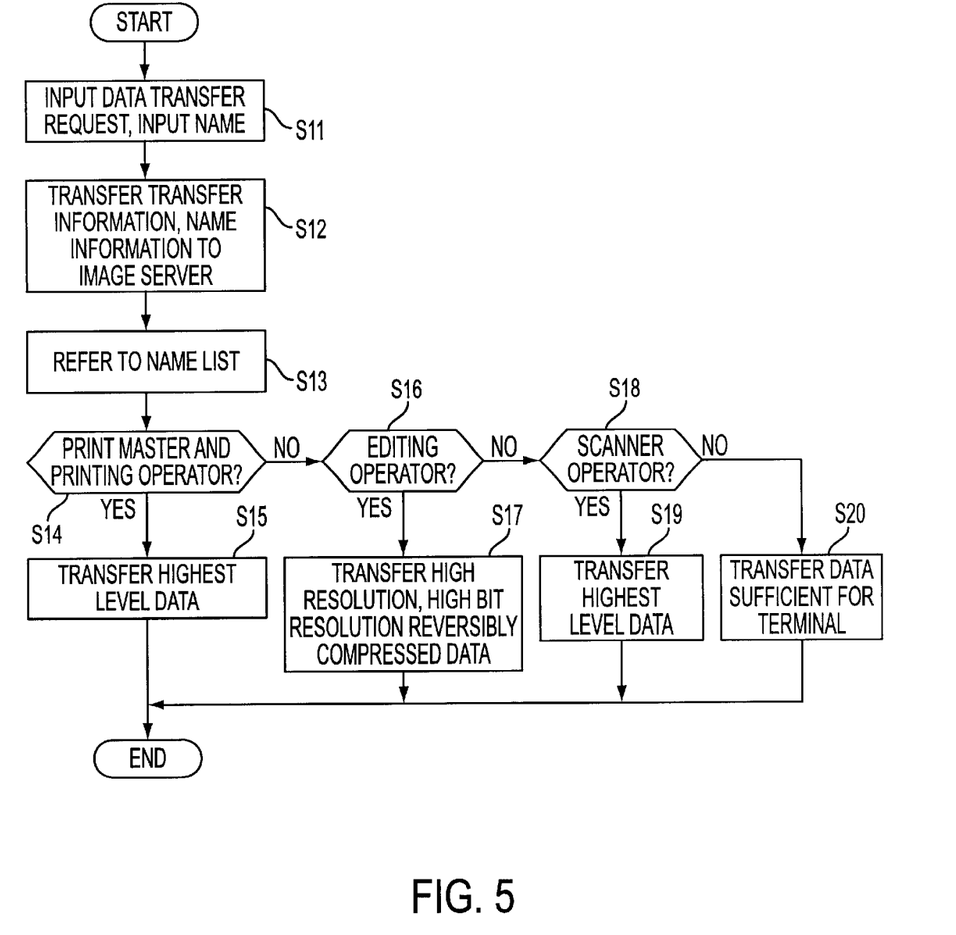
FIG. 5 is a flow chart showing processing carried out by the data transfer system according to the second embodiment.

An operation of the second embodiment will be explained next. FIG. 5 is a flow chart showing processing carried out by the data transfer system according to the second embodiment. An instruction to transfer the image data S0 is input from the natural image input terminal 13, the character and drawing image input terminal 14, the editing terminal 15, the remote proof terminal 16, the print master recorder 17 or the proofreading printer 18 (hereinafter simply called the terminals), and the name of the terminal user is input (step S11). The terminal transfers to the image server 12 transfer information regarding the image data S0 and information regarding the terminal user name via the network 19 (step S12). Having receiving the information, the image server 12 refers to a name list registered in a database of the image server 12, based on the information regarding the name (step S13), and judges whether or not the name is the name of the print master and printing operator (step S14). In the case where the name is the name of the print master and printing operator, data at a highest level, that is, reversibly compressed data at a highest resolution and having a highest bit resolution are specified and transferred to the print master recorder 17 or the proofreading printer 18 (step S15) to finish processing.

Meanwhile, in the case where the name is not the name of the print master and printing operator, whether or not the name is the name of the editing operator is judged (step S16). If the name is the name of the editing operator, reversibly compressed data at the highest resolution and the highest bit resolution are specified and transferred to the character and drawing input terminal 14 or the editing terminal 15 (step S17) to finish processing.

If the name is not the name of the editing operator, whether or not the name is the name of the scanner operator is judged (step S18). If the name is the name of the scanner operator, the highest level data, that is, the reversibly compressed data at the highest resolution and the highest bit resolution, are specified and transferred to the natural image input terminal 13 (step S19) to finish the processing, in the case where the requested image data S0 are data of a natural image. If the requested image data S0 are not data of a natural image, data at a level lower than the highest are transferred.

In the case where the name is not the name of the scanner operator either, the name is judged to be the name of the orderer, and data having a sufficient resolution and bit resolution for the remote proof terminal 16 are automatically specified based on the terminal information of the proofreading terminal 16 (step S20) to finish the processing.

As has been described above, according to the second embodiment, the data at a level appropriate for the terminal user are transferred based on the name of the terminal user input from the terminal. Therefore, the data at the desired level are transferred without the terminal user's inputting the level of the data to be transferred. In this manner, data at a desired level can be transferred easily, without a troublesome operation for specifying the level.

In the second embodiment, if the image server 12 stores the image data S0 as CMYK data, the CMYK data are transferred as they are in the case where the proofreading printer 18 is a CMYK printer. On the other hand, if the image data S0 are transferred to a CRT of each terminal, the CMYK data are converted into RGB data and transferred thereafter.

In the second embodiment, the name of the terminal user is input from the terminal and the level of the data to be transferred is determined based on the name. However, as in the first embodiment, the terminal user may be identified by the ID, a voice, a fingerprint, a handprint, or a face image of the user.

In the second embodiment above, the information to identify the terminal user is input from the terminal. However, as in the first embodiment, the information specific to the terminal may be transferred to the image server 12 upon requesting transfer of the image data S0.

In the second embodiment above, when transfer of the image data S0 is requested by the terminal, the image data S0 may be transferred after the level of the image data S0 is judged in accordance with a transfer rate of the network 19, as in the first embodiment.

In the second embodiment above, a condition regarding the level at the time of data transfer may be added to the image data S0 at the time the image data S0 are referred to for the first time, so that the image data S0 can be transferred to any one of the terminals, based on the added condition of the level.

In the first and the second embodiments described above, the image server storing the image data at a plurality of levels are used. However, an image server comprising means for storing one set of image data at a high level and for converting the level of the image to be output may be used, instead of the image server described above. Hereinafter, this case will be explained as a third embodiment, referring to FIG. 6.

Figure 6:
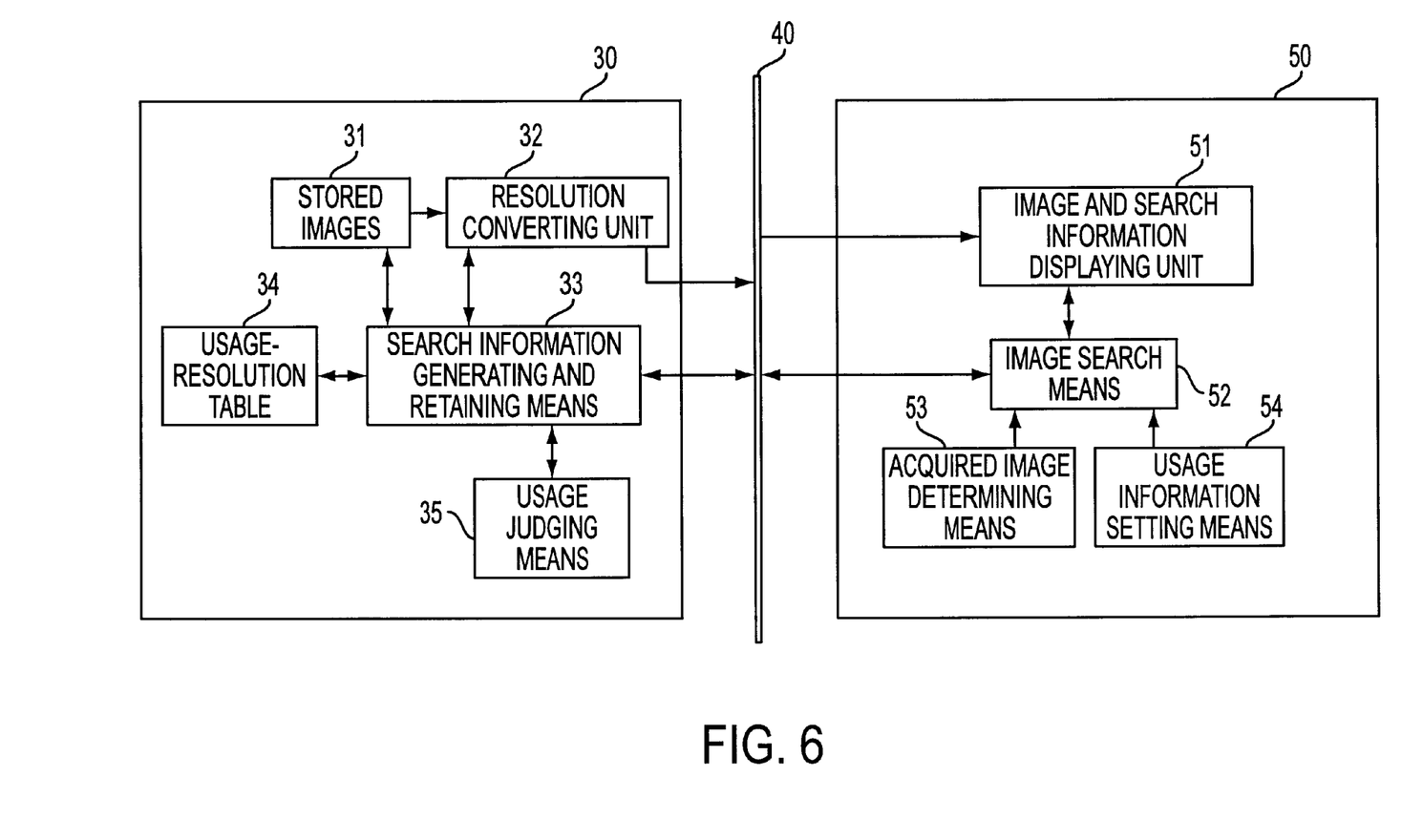
FIG. 6 is a block diagram showing an outline configuration of a data transfer system according to a third embodiment of the present invention.

FIG. 6 is a block diagram showing an outline configuration of a data transfer system according to the third embodiment. An image server 30 comprises a memory (stored images) 31 for storing images at high resolutions as the high level image data, and a resolution converting unit 32 for converting the resolution of the image to a desired resolution lower than that. The resolution converting unit 32 converts the resolution by carrying out any resolution converting processing such as reduction using thinning or interpolation processing on the image data.

The image server 30 comprises a search information generating and retaining unit 33 for generating and retaining search information for searching for an image based on an acquisition request transferred via a network 40. The acquisition request includes information specifying a target image and usage of the image. The image server 30 comprises usage judging means 35 for judging the usage based on the usage information, and a usage-resolution table 34 for storing correspondence between the usage and the resolution. Based on the acquisition request transferred via the network 40, the search information generating and retaining unit 33 searches for the image, judges the usage of the image based on the usage information from the usage judging means 35, finds out the resolution corresponding to the usage by using the usage-resolution table 34, notifies the resolution converting unit 32 of the resolution, searches the stored images for the target image, and outputs the image data at the resolution by converting the resolution of the target image.

A display apparatus 50 comprises an image and search information displaying unit 51, an image search means 52, acquired image determining means 53, and usage information setting means 54. The display apparatus 50 determines the acquired image, sets the usage information of the image, and transfers the usage information by adding it to information for obtaining the target image to the image server 30.

A procedure for transferring an image from the image server 30 to the display apparatus 50 via the network 40 in this system is as follows.

The display apparatus 50 accesses a database in the image server 30 and selects one or a plurality of the acquisition target images and the usage information thereof. An acquisition request including information of the target image and the usage is transferred to the image server 30. Based on the request, the image server 30 finds out the resolution corresponding to the usage from the usage-resolution table 34, and converts the resolution of the image data of the stored image 31 by using the resolution converting unit 32. The image at the resolution converted in this manner are transferred to the display apparatus 50 via the network 40.

The usage-resolution table 34 sets the ratio of the resolution of the original image to that of the converted image to 1:1 in the case of a diagnostic purpose, 1:10 in the case of a reference or confirmation purpose, and to 1:5 in the case of a predetermined interval subtraction.

In the third embodiment, the usage information is transferred from the display apparatus 50 to the image server 30. However, in some cases, the needed resolution is found without the usage information if a requester, that is, the display apparatus 50, is known. Therefore, the requester is confirmed by the image server 30 and the resolution is determined by referring to a requester-resolution table. This case will be explained as a fourth embodiment below, referring to FIG. 7.

Figure 7:
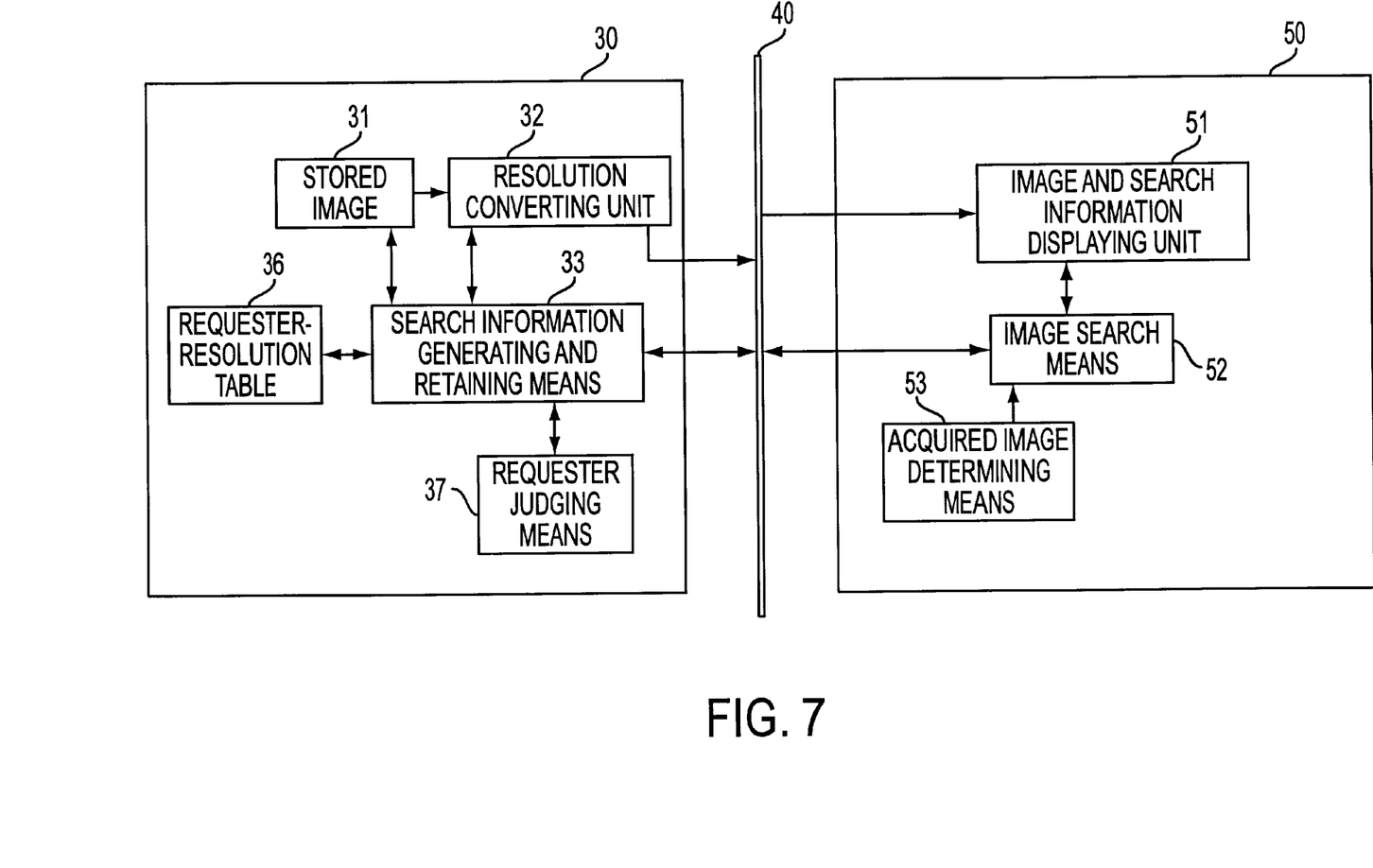
FIG. 7 is a block diagram showing an outline configuration of a data transfer system according to a fourth embodiment of the present invention.

FIG. 7 is a block diagram showing an outline configuration of a data transfer system according to the fourth embodiment. In the fourth embodiment, the usage-resolution table 34 and the usage judging means 35 in the third embodiment are replaced by a requester-resolution table 36 and requester judging means 37. The display apparatus 50 in the fourth embodiment does not comprise the usage information setting means 54.

In this embodiment, the server 30 judges which display apparatus (terminal) 50 has requested image acquisition using the requester judging means 37. Based on the acquisition request, the search information generating and retaining means 33 searches for the image, and the requester is judged by the requester judging means 37. Using the requester-resolution table 36, the resolution corresponding to the requester is found and notified to the resolution converting unit 32. The target image is found from among the stored images 31 and the target image is output after being converted into image data at the resolution.

This is efficient for the case where each section in a hospital always has a predetermined request regarding the resolution specific to the section.

What is claimed is:

1. A method of transferring image data from an image server storing image data comprising a plurality of levels to a plurality of terminals, at least two of the terminals comprising at least one of a CRT display, an LCD display, a projection display, and a plasma display connected to the image server, the method comprising:

obtaining information regarding a first terminal of the plurality of terminals;

transferring to the first terminal the image data at a level of resolution appropriate for the first terminal, based on the information regarding the first terminal;

obtaining information regarding a second terminal of the plurality of terminals; and transferring to the second terminal the image data at a higher level of resolution than for the first terminal, based on the information regarding the second terminal.

2. A method of transferring image data to a plurality of terminals, at least two of the terminals comprising at least one of a CRT display, an LCD, a projection display, and a plasma display, connected to an image server which comprises means for storing image data and converting a level of an image to be output, the method comprising:

obtaining information regarding a first terminal of the plurality of tenminals;

transferring to the first terminal the image data at a level of resolution appropriate for the terminal, based on the information regarding the terminal;

obtaining information regarding a second terminal of the plurality of terminals; and transferring to the second terminal the image data at a higher level of resolution than for the first terminal, based on the information regarding the second terminal.

3. A data transfer method as claimed in claim 1 or 2 wherein the information regarding the first terminal is information specific to the first terminal.

4. A data transfer method as claimed in claim 1 or 2 wherein the information regarding the first terminal is information regarding usage of the image data and input from the first terminal.

5. A method of transferring image data from an image server storing image data comprising a plurality of levels to a plurality of terminals, at least two of the terminals comprising at least one of a CRT display, an LCD, a projection display, and a plasma display connected to the image server, the method comprising:

obtaining information regarding a first terminal of the plurality of terminals;

transferring to the first terminal the image data at a level of resolution appropriate for the first terminal, based on the information obtained regarding the first terminal;

obtaining information regarding a second terminal of the plurality of terminals; and transferring to the second terminal the image data at a higher level of resolution than for the first terminal, based on the information obtained regarding the second terminal, wherein the information regarding the first terminal is information regarding a user of the first terminal input from the terminal.

6. An apparatus for transferring image data from an image server storing image data comprising a plurality of levels to a plurality of terminals, at least two of the terminals comprising at least one of a CRT display, an LCD, a projection display, and a plasma display, connected to the image server, the apparatus comprising:

terminal information obtaining means for obtaining information regarding a terminal of the plurality of terminals;

transfer means for transferring to a first terminal the image data at a level of resolution appropriate for the first terminal, based on the information obtained regarding the first terminal, and for transferring to a second terminal of the plurality of terminals the image data at a higher level of resolution than for the first terminal, based on the information obtained regarding the second terminal.

7. An apparatus for transferring image data to a plurality of terminals, at least two of the terminals comprising at least one of a CRT display, an LCD, a projection display, and a plasma display, connected to an image server which comprises means for storing image data and converting a level of an image to be output, the apparatus comprising:

terminal information obtaining means for obtaining information regarding a terminal of the plurality of terminals; transfer means for transferring to the first terminal of the plurality of terminals the image data at a level of resolution appropriate for the first terminal, based on the information regarding the first terminal, and for transferring to a second terminal of the plurality of terminals the image data at a higher level of resolution than for the first terminal, based on the information obtained regarding the second terminal.

8. A computer readable recording medium storing a program to cause a computer to execute a method of transferring image data from an image server storing image data comprising a plurality of levels to a plurality of terminals, at least two of the terminals comprising at least one of a CRT, an LCD, a projection, and a plasma display, connected to the image server, the program comprising:

obtaining information regarding a first terminal of the plurality of terminals;

transferring to the first terminal the image data at a level of resolution appropriate for the terminal, based on the information regarding the terminal;

obtaining information regarding a second terminal of the plurality of terminals; and transferring to the second terminal the image data at a higher level of resolution than for the first terminal, based on the information obtained regarding the second terminal.

9. A computer readable recording medium storing a program to cause a computer to execute a method of transferring image data to a terminal of a plurality of terminals, at least two of the terminals comprising at least one of a CRT display, an LCD, a projection display, and a plasma display, connected to an image server which comprises means for storing image data and converting a level of an image to be output, the program comprising:

obtaining information regarding a first terminal of the plurality of terminals; and transferring to the first terminal the image data at a level of resolution appropriate for the first terminal, based on the information regarding the terminal;

obtaining information regarding a second terminal of the plurality of terminals; and transferring to the second terminal the image data at a higher level of resolution than for the first terminal, based on the information obtained regarding the second terminal.

10. An image data transmission system comprising:

an image server storing image data at a plurality of levels of resolution;

a plurality of terminals, at least two of the terminals comprising at least one of a CRT display, an LCD, a projection display, and a plasma display, coupled by a network to the image server;

means for automatically obtaining information regarding each of said plurality of terminals via said network;

means for converting said image data to image data of a level of resolution appropriate for each terminal of said plurality of terminals based on the information obtained regarding each terminal of said plurality of terminals; and means for transmitting to a first terminal of said plurality of terminals said image data at a level of resolution appropriate for the first terminal based on the information obtained regarding the first terminal, and for transmitting to a second terminal of said plurality of terminals the image data at a higher level of resolution than for the first terminal, based on the information obtained regarding the second terminal.

11. The system of claim 10, wherein the information obtained regarding the second terminal comprises information regarding a user of said terminal.

12. The system of claim 10, wherein the information obtained regarding the second terminal comprises information regarding the configuration of said terminal.

13. An image data transmission system comprising:

an image server storing image data;

a plurality of terminals, at least two of the terminals comprising at least one of a CRT display, an LCD, a projection display, and a plasma display, coupled to the image server;

an information obtaining module, configured to obtain automatically terminal information regarding a terminal of said plurality of terminals;

a terminal information database configured to store information about each terminal, from which terminal information database the obtained terminal information is used to determine the appropriate level of resolution and density appropriate for said terminal;

a data conversion module configured to convert, prior to transfer, said image data to a level of resolution and density appropriate for said terminal; and a data transfer module configured to transfer to a first terminal of said plurality of terminals said image data at a level of resolution and density appropriate for said first terminal, based on the information obtained regarding said terminal, and to transfer to a second terminal of said plurality of terminals the image data at a higher level of resolution than for the first terminal, based on the information obtained regarding the second terminal, wherein image data at a high level of resolution and density are reversibly compressed and image data at a low level of resolution and density are irreversibly compressed.

14. The system of claim 13, wherein the information obtained regarding the first terminal comprises information regarding a user of said first terminal.

15. The system of claim 13, wherein the information obtained regarding the first terminal comprises information regarding the configuration of said first terminal.

* * * * *